United States Patent [19]
Goldbach

[11] Patent Number: 5,669,966
[45] Date of Patent: Sep. 23, 1997

[54] FILLER FOR A BITUMINOUS MIXTURE

[75] Inventor: Erhard Goldbach, Herne, Germany

[73] Assignee: ReDeLa Herstellung und Vertrieb von Baustoffen GmbH, Blankenhain-Grosspillingsdorf, Germany

[21] Appl. No.: 568,791

[22] Filed: Dec. 7, 1995

Related U.S. Application Data

[63] Continuation-in-part of Ser. No. 108,819, Aug. 17, 1993, abandoned.

[30] Foreign Application Priority Data

Aug. 17, 1992 [DE] Germany .................. 42 27 153.3

[51] Int. Cl.$^6$ .................. C08L 93/00; C08L 1/00
[52] U.S. Cl. .................. 106/242; 106/203.3; 106/233; 106/235; 106/241; 106/403; 106/500; 106/501.1
[58] Field of Search .................. 106/202, 281.1, 106/282, 203.3, 232, 233, 235, 241, 242, 403, 407, 425, 426, 427, 429, 469, 472, 473, 474, 500, 501.1, 503

[56] References Cited

U.S. PATENT DOCUMENTS

| | | | |
|---|---|---|---|
| 2,806,825 | 9/1957 | Wentland | 106/202 |
| 4,738,723 | 4/1988 | Frizzell et al. | 106/202 |

FOREIGN PATENT DOCUMENTS

| | | | |
|---|---|---|---|
| 0344141 | 11/1989 | European Pat. Off. | 106/202 |
| 2251161 | 4/1973 | Germany | 106/282 |
| 2086401 | 5/1982 | United Kingdom | 106/282 |

*Primary Examiner*—Anthony Green
*Attorney, Agent, or Firm*—Friedrich Kueffner

[57] ABSTRACT

A filler for a bituminous mixture, particularly asphalt mastic, includes a mixture of a stone-like natural product, for example, rock dust, and an industrial product in the form of pulverized resin with cellulose fiber substances. Approximately 80 percent of the mixture preferably have a grain size of less than 0.09 mm. The pulverized resin with cellulose fiber materials is produced particularly as a dust-like abrasion product during the grinding, cutting or drilling processing of clutch linings or brake linings.

1 Claim, No Drawings

FILLER FOR A BITUMINOUS MIXTURE

This is a continuation-in-part of prior application Ser. No. 08/108,819, filed on Aug. 17, 1993 and now abandoned.

BACKGROUND OF THE INVENTION

1. Field of the Invention

The present invention relates to a filler for a bituminous mixture, particularly asphalt mastic or matrix.

2. Description of the Related Art

Bituminous mixtures used as road topping, particularly in the form of mastic asphalt, are usually composed of stone chips having various grain sizes ranging from approximately 2 mm to approximately 16 mm, sands of various grain sizes ranging between approximately 0.09 mm and 2 mm, and a filler of stone dust which stiffens the mixture, wherein the ratio of stone chips to sand to filler is approximately 75:16:9 in percent by weight.

Fillers which have been used in the past are predominantly those which are obtained from natural deposits, such as gravel pits, quarries, etc. However, in recent times, it has become more and more apparent that there is no unlimited supply of the natural materials and, consequently, these materials must be used sparingly. Accordingly, it has been evaluated to what extent industrial by-products or waste products can replace the above-mentioned fillers from natural deposits.

Such industrial by-products are, for example, secondary rocks from hard coal, slags from ironworks, power plant residues, rubber, road surface break-ups, or ash from garbage incinerators. As a rule, these by-products are not reused or further used and usually are deposited on special garbage dumps. However, this also represents the particular problem involved with such by-products. The compositions of these by-products are usually not known, so that it is doubtful whether they are suitable as fillers for bituminous mixtures with respect to environmental compatibility.

SUMMARY OF THE INVENTION

Therefore, it is the primary object of the present invention to provide a filler for bituminous mixtures which, without negatively influencing the environment, is capable of replacing a high percentage of natural materials, such as, stone dust by industrial by-products.

In accordance with the present invention, a filler for a bituminous mixture is obtained by mixing a natural product, such as stone dust, with a special pulverized industrial by-product from resin and cellulose fibrous substances. Such a by-product is produced in many fields of industry, and particularly in those instances in which products containing cellulose fibrous substances embedded in resin are processed either manually or by machines. Experiments have demonstrated that the natural products, such as, stone dust, can be replaced to a significant degree by pulverized industrial by-products having certain material compositions, wherein a substantial stiffening of the mixture was found. This finding is due to the fact that, even in pulverous or dust-like products obtained by, for example, drilling or cutting processing, the fibrous substances which are present especially in hooklike form are at least partially released and, thus, have a stabilizing effect when used in asphalt mixtures. A tendency to segregation was not found. In the case of a high compression resistance, an extremely durable mastic of asphalt is provided, so that the problem of grooves formed in particular in heavily traveled roads can be essentially eliminated.

The mixing ratio of the natural product, such as, stone dust, on the one hand, and the pulverized industrial by-product, on the other hand, may vary. The mixing ratio to be used in each individual case depends on the type of natural product being used and on what materials the industrial by-product is composed of. The preferred mixing ratio of stone dust and pulverized industrial by-product obtained from drilling, grinding or cutting clutch linings and/or brake linings is 2:1.

In accordance with an advantageous feature of the present invention, approximately 80 percent by weight of the mixture has a grain size of less than 0.09 mm. The remaining approximately 20 percent by weight of the mixture may have a grain size of up to approximately 2 mm.

The pulverized industrial by-product used in the filler for bituminous mixtures in accordance with the present invention contains 5% to 20% by weight pulverized phenol/cresol resin and 2% to 20% by weight cellulosic, slightly elastic hook-shaped fibrous substances. These substances are particularly fiber substances of cellulose or aramide. Aramides are aromatic polyamides produced from terephthalic acid and isophthalic acid and phenylene diamines and which have a high resistance to increased temperature and a high resistance to tearing.

Typically, the pulverized industrial by-product obtained from drilling or cutting processing of clutch linings and/or break linings has the following composition:

| | |
|---|---|
| Synthetic fibers | 2–20% by weight |
| mineral wool | 5–35% by weight |
| rubber | 5–20% by weight |
| phenol/cresol resins | 5–20% by weight |
| brass/copper | 7.5–15% by weight |
| talcum | 5–10% by weight |
| graphite | 5–10% by weight |
| soot | 2–8% by weight |
| mineral substances | 5–55% by weight |
| magnesium oxide | 2–10% by weight |
| vulcanizing agents | 0.5–2% by weight |
| sulphur | 2–8% by weight |
| zinc oxide | 0.5–3% by weight |
| barium sulphate | 3–15% by weight |

With respect to the above table, mineral wool is understood to be referring to fiber materials of melted minerals. Typical components of mineral wool are glass fibers obtained from liquid glass, stone wool obtained from molten limestone and marl, and basalt wool obtained from molten basalt.

With respect to the mineral substances contained in the pulverized industrial by-product, the specific contents depend on the mixture used by the manufacture of the clutch lining or break lining. Typically, these mineral substances include, but are not limited to, the salts of the elements sodium, potassium, calcium, magnesium, nitrogen, phosphorous, sulphur and chlorine.

A typical composition of the stone dust used in the filler according to the present invention is as follows:

$SiO_2$: approx. 42% by weight

CaO: approx. 16% by weight $Al_2O_3$: approx. 14% by weight $Fe_2O_3$: approx. 12% by weight MgO: approx. 9% by weight.

The present invention is particularly based on the finding that, as pulverized resin with cellulose fibrous substances, dust from drilling, grinding or cutting can be used which are produced in large amount in the processing of clutch linings and/or brake linings in various fields of industry, for example, in the clutch-producing industry or the automobile industry. In the past, these dusts had to be deposited as special waste products on appropriate dumps. Of course, this meant that depositing these dusts was expensive because of the difficult transportation and storage. In addition, dumping of the dusts resulted in enormous danger to the environment.

In the filler for a bituminous mixture according to the present invention, it is now possible to further completely use these dusts. Accordingly, these dusts no longer represent special waste and, thus, do not result in the problems which accompanies the dumping of special waste materials.

The above-described state of the art is also described in the magazine "Baustoff Recycling+Deponietechnik" 5/88, pp. 12–15, and the special edition of this magazine on the occasion of ENTSORGA '88, pp. 18–26.

The various features of novelty which characterize the invention are pointed out with particularity in the claims annexed to and forming a part of the disclosure.

I claim:

1. A filler for a bituminous mixture, the filler comprising a mixture of stone dust and a pulverized industrial by-product, wherein a ratio of stone dust to industrial by-product is 2:1, wherein the industrial by-product comprises 5% to 20% by weight pulverized phenol/cresol resin and 2% to 20% by weight elastic, hook-shaped fiber materials of cellulose or aramid, and a material obtained from grinding or cutting hardened clutch linings and/or brake linings comprising mineral wool, rubber, brass/copper, talcum, graphite, soot, magnesium oxide, vulcanizing agents, sulphur, zinc oxide and barium sulphate, and wherein approximately 80% of the filler has a grain size of less than 0.09 mm.

* * * * *